July 22, 1924.

J. N. KELMAN ET AL

CUSHION

Filed Jan. 16, 1922    2 Sheets-Sheet 1

1,502,387

INVENTORS:
JOSEPH N. KELMAN,
JOHN H. KELMAN,
BY Graham + Lewis
ATTORNEYS.

July 22, 1924.
J. N. KELMAN ET AL
1,502,387
CUSHION
Filed Jan. 16, 1922   2 Sheets-Sheet 2
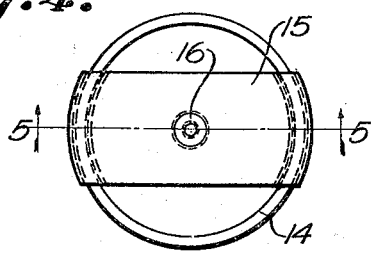
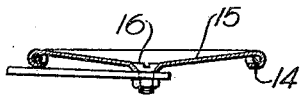
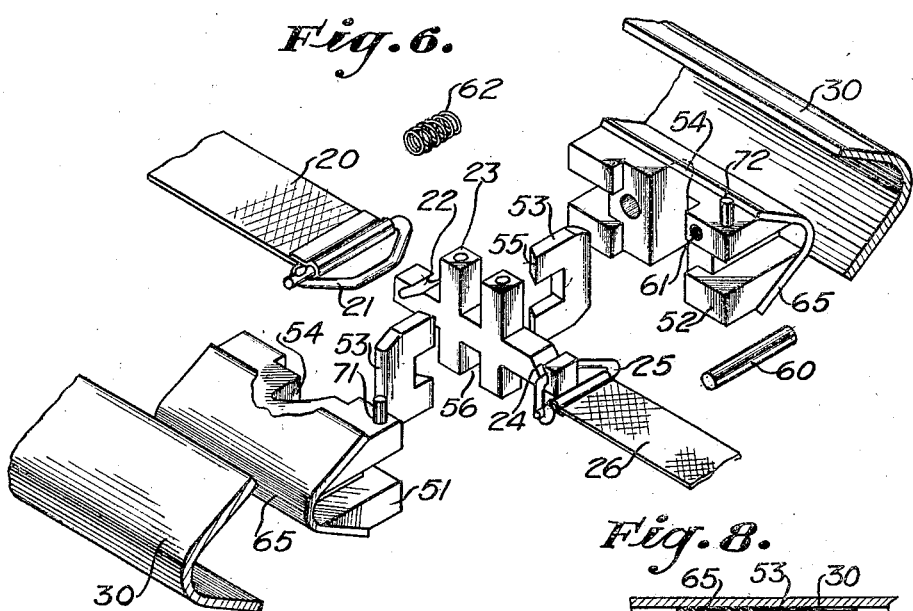
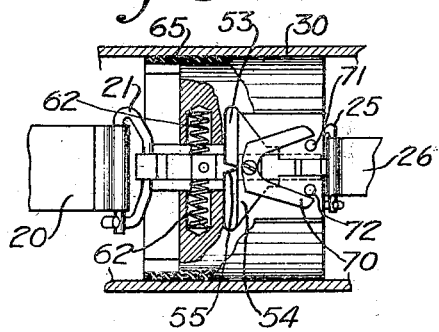
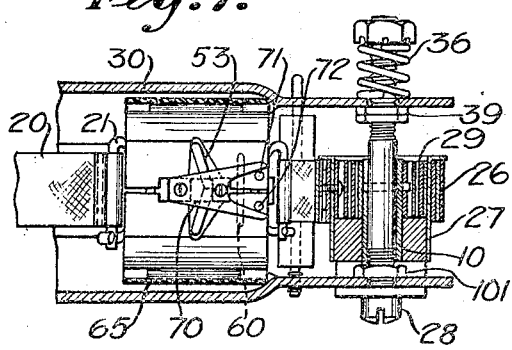
INVENTORS:
JOSEPH N. KELMAN,
JOHN H. KELMAN,
BY Graham + Lavis
ATTORNEYS.

Patented July 22, 1924.

1,502,387

UNITED STATES PATENT OFFICE.

JOSEPH N. KELMAN AND JOHN H. KELMAN, OF LOS ANGELES, CALIFORNIA.

CUSHION.

Application filed January 16, 1922. Serial No. 529,471.

*To all whom it may concern:*

Be it known that we, JOSEPH N. KELMAN and JOHN H. KELMAN, both citizens of the United States, residing at Los Angeles, in the county of Los Angeles and State of California, have invented a new and useful Improvement in Cushions, of which the following is a specification.

Our invention relates to cushions and more particularly to cushions used in vehicles. The invention is particularly applicable to automobile cushions. In the standard construction of automobiles, it is common practice to provide flat springs between the axles and the body of the automobile and to provide coiled springs in the cushions which support the weight of the passenger and further diminish the transference of shock from the road to the passenger. It is highly desirable that the cushion springs be flexible to provide for ease in riding, but when these springs are made flexible, they have a disagreeable tendency to throw the passengers into the air in passing over obstructions in the roadway. This is due to the fact that the springs on the vehicle and the springs in the cushion are rapidly compressed due to the sudden lifting of the axle against the inertia of the passenger, these springs then suddenly expanding and tending to throw the passenger upwardly. Flexible springs which provide ease of riding on moderately smooth roads are positively dangerous on very rough roads.

It is an object of our invention to provide a cushion which will have very flexible springs, these springs being readily compressed to compensate for inequalities in the roadway, but being provided with means for preventing the sudden expansion thereof, thus doing away with the objectionable tendency to throw the passenger in the air.

A further object of the invention is to provide means in such a cushion for frictionally retarding the expansion of the springs.

A still further object of the invention is to provide in such a cushion means for varying the frictional action to suit the characteristic of the spring.

Further objects and advantages will be made evident hereinafter.

Referring to the drawing which is for illustrative purpose only,

Fig. 4 is a plan view of a spring cap.

Fig. 5 is a section on a plane represented by the line 5—5 of Fig. 4.

Fig. 6 is a perspective view showing a portion of the mechanism in disassembled position.

Fig. 7 is a plan view partly in section of a portion of the mechanism with the friction blocks in their retracted position, and, Fig. 8 is a similar view showing the friction blocks in their expanded position.

Figure 1:
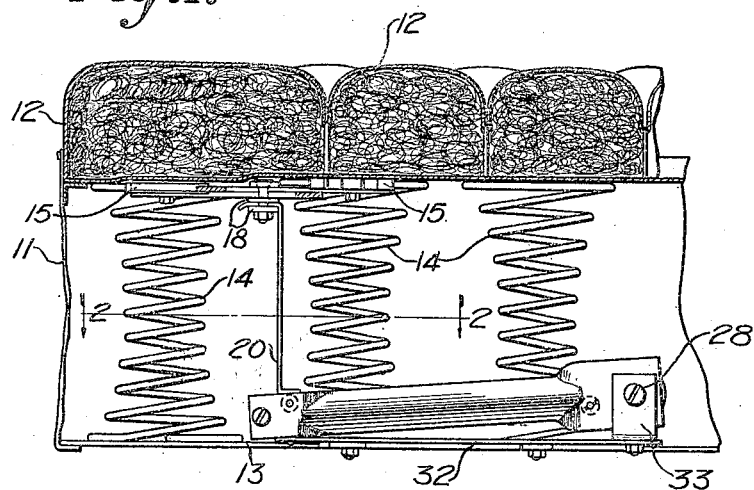
Fig. 1 is a cross section of a portion of a cushion equipped with our invention.

In the form of the invention illustrated, a cushion 11 is shown provided with an upper cushion member 12 and a lower cushion member 13. Secured between these members 12 and 13 are spiral springs 14, the lower end of these springs being fastened to the structure 13 and the upper end of a portion of them being carried in spring caps 15, each of which is secured by a central bolt 16 to one of several cross bars 17. Secured in the center of the cross bars 17 are pulling strap clamps 18 to which the end of a pulling strap 20 is secured. The pulling strap 20 is preferably made of webbing and has its other end secured in a pulling strap buckle 21. The pulling strap buckle 21 fits in a notch 22 in a pull bar 23, this pull bar having a similar notch 24 at the other end for receiving a take-up strap buckle 25 which is secured in a take-up strap 26. The take-up strap 26 is coiled upon a drum 27 which is free to turn upon a sleeve 10 secured upon a rear adjustment bolt 28. A spiral spring 29 is secured between the members 27 and 10 so as to rotate the drum 27 and exert considerable tension on the take-up strap 26.

Side bars 30 are provided, these bars being of V shaped cross section as shown in Fig. 6, one end of these bars being carried on the bolt 28 and the other end being carried on a pin 301 carried upon a bracket 31 which is secured to a base 32. The base 32 is secured to the structure 13. The base 32 also has a bracket 33 which engages and supports the bolt 28. A roller 34 is carried on the pin 301, the pull strap 20 passing therearound. A forward bolt 35 is provided, this bolt being secured in one of the side bars 30. A main spring 36 is provided on the bolt 28 and an auxiliary spring 37 is provided on the bolt 35. These springs tend to force the side bars 30 towards each other, the amount of this movement being limited by nuts 39 and 40 on the bolts 35 and 28 respectively.

Two friction blocks 51 and 52 are provided, these blocks being so shaped that they engage the side bars 30 and slide with the pull bar 23. Toggle links 53 are provided, these links each having a cylindrical outer surface fitting in a groove 54 in the friction block 51 and having beveled ends 55 which lie together in the position shown in Fig. 7, in the retracted position of the parts, the ends 55 meeting inside slots 56 formed in the pull bar 23. An alignment pin 60 is provided, this pin fitting in cavities 61 in the friction blocks 51 and 52 and compression springs 62 are also provided, these springs fitting into cavities in the friction blocks 51 and 52. The friction blocks 51 and 52 are preferably provided with leather facings 65 and are of a proper contour to fit inside the side bars 30.

Figure 2:
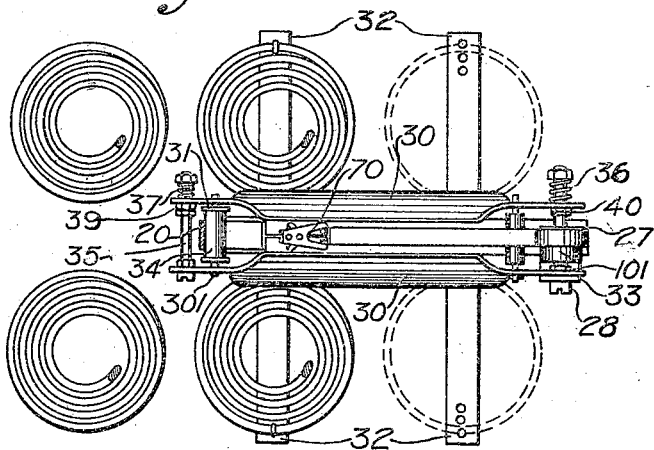
Fig. 2 is a section on a plane represented by the line 2—2 of Fig. 1.
Figure 3:
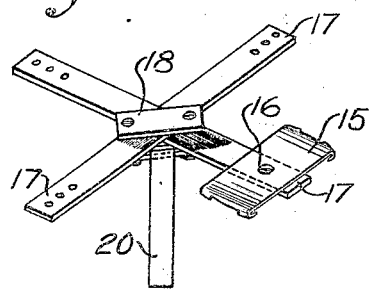
Fig. 3 is a perspective view of the strap connection.

The method of operation is as follows:

The parts are shown in their normal position in Fig. 1 and Fig. 2. If for any reason the springs 14 are suddenly compressed due, for example, to the wheels of the automobile passing over an obstruction, the initial tension on the pull strap 20 is released and this strap tends to slacken, the amount of slack of course depending upon the degree to which the springs 14 are depressed. Due to the slackening of the pull strap 20, the pull bar 23 is pulled from left to right as viewed in Fig. 2 due to the action of the spring 29 and the take-up strap 26. During the motion of the pull bar from left to right, which may be called a movement in a negative direction, the friction shoes 51 and 52 are pulled into the position shown in Fig. 7 due to the presence of a retracting member 70 carried on the top of the pull bar 23 and which engages pins 71 and 72 carried on the members 51 and 52 respectively, the toggle links 53 collapsing to allow the friction shoes to approach each other. The inward movement of the side bars 30 towards each other is limited by the lock nuts 39 and 40. As soon as the shoes 50 and 51 have been pulled towards each other enough to allow the side bars 30 to rest on the nuts 39 and 40, any further movement of the shoes towards each other relieves the friction. As the shoes and side bars wear, the wear may be compensated for by adjusting the nuts 39 and 40. In other words, during its movement in a negative direction, no friction or very little friction is exerted between the friction shoes 51 and 52 and the side bars 30. If the obstruction is a large one, the amount of compression of the springs 14 is also large and the pull bar 23 may move the entire length of the side bars 30.

As soon as the compression of the spring 14 ceases and it starts to expand, the pull bar is pulled in a positive direction, this movement of the pull bar tending to straigthen out the toggle links 53 into a straight line as shown in Fig. 8 thus expanding the members 51 and 52 and forcing them apart so that the leather facings 65 engage the inside of the side bars 30. The amount of friction produced is dependent upon the tension of the springs 36 and 37. The tension of these springs may be adjusted by means of nuts on the bolts 28 and 35. The main spring 36 is preferably considerably heavier than the auxiliary spring 37 and the friction at the beginning of the positive stroke is considerably greater than the friction at the end of this stroke. The amount of this friction is adjusted by adjusting the tension of the springs 36 and 37. During the positive stroke, that is to say, during the expansion of the spring 14, the leather members 65 rub on the inside of the members 30 exerting a considerable friction and greatly delaying the expansion of the spring. The slow expansion of the spring 14 prevents it from throwing the passenger into the air, this expansion being gradual and not felt by the passenger.

The spring 62 is provided for the purpose of giving a slight initial friction at the beginning of the positive stroke. The buckles 21 and 25 are provided to allow for ready repair or replacement of the pull strap and the take-up strap.

The tension of the spring 29 can be readily adjusted by releasing a lock nut 101 on the bolt 28 which is then turned by a screw driver to the desired degree, being locked in position by the nut 101.

We claim as our invention:

1. A shock absorber for use within a cushion and comprising: parallel members in the form of side bars wholly within said cushion; a friction block sliding in said members; and elastic means for causing said members to engage said block to increase the friction as said block travels from one end of said members to the other end of said members.

2. In a shock absorber, the combination of two side bars; two friction blocks situated between said side bars; means for forcing said friction blocks apart to frictionally grip said side bars with increased friction when said friction blocks are pulled in one direction from one end of said bars to the other; and means for forcing said blocks towards each other to decrease said frictional grip when said blocks are pulled in the opposite direction.

3. In a shock absorber, the combination of two side bars; elastic means for forcing said side bars towards each other; two friction blocks sliding between said side bars; a pull bar; a pull strap fastened to one end of said pull bar and adapted to pull said pull bar in a positive direction; means for pulling said pull bar in a negative direction; and means by which said pull bar forces said friction blocks against side bars when said pull bar is pulled in a positive direction.

4. In a shock absorber, the combination of two side bars; elastic means for forcing said side bars towards each other; two friction blocks sliding between said side bars; a pull bar; a pull strap fastened to one end of said pull bar and adapted to pull said pull bar in a positive direction; means for pulling said pull bar in a negative direction; and toggle members between said pull bar and said friction block so disposed as to force said friction blocks against said side bars when said pull bar is pulled in a positive direction.

5. In a shock absorber, the combination of two side bars; elastic means for forcing said side bars towards each other; two friction blocks sliding between said side bars; a pull bar; a pull strap fastened to one end of said pull bar and adapted to pull said pull bar in a positive direction; a takeup strap fastened to the other end of said pull bar; means for exerting a tension on said takeup strap; and means by which said pull bar forces said friction blocks against said side bars when said pull bar is pulled in a positive direction.

6. In a shock absorber, the combination of two side bars; elastic means for forcing said side bars towards each other; two friction blocks sliding between said side bars; a pull bar; a pull strap fastened to one end of said pull bar and adapted to pull said pull bar in a positive direction; a takeup strap fastened to the other end of said pull bar; means for exerting a tension on said takeup strap; and toggle members between said pull bar and said friction block so disposed as to force said friction blocks against said side bars when said pull bar is pulled in a positive direction.

7. In a shock absorber, the combination of two side bars; elastic means for forcing said side bars towards each other; two friction blocks sliding between said side bars; a pull bar; a pull strap fastened to one end of said pull bar and adapted to pull said pull bar in a positive direction; a takeup strap fastened to the other end of said pull bar; a coil spring; means for fastening the other end of said takeup strap to said coil spring; and means by which said pull bar forces said friction blocks against said side bars when said pull bar is pulled in a positive direction.

8. In a shock absorber, the combination of two side bars; elastic means for forcing said side bars towards each other; two friction blocks sliding between said side bars; a pull bar; a pull strap fastened to one end of said pull bar and adapted to pull said pull bar in a positive direction; a takeup strap fastened to the other end of said pull bar; a coil spring; means for fastening the other end of said takeup strap to said coil spring; and toggle members between said pull bar and said friction block so disposed as to force said friction blocks against said side bars when said pull bar is pulled in a positive direction.

9. In a shock absorber, the combination of two side bars; adjustable elastic means for forcing one end of said bars towards each other; independent adjustable means for forcing the other end of said bars towards each other; two friction blocks sliding between said side bars; a pull bar; a pull strap fastened to one end of said pull bar and adapted to pull said pull bar in a positive direction; means for pulling said pull bar in a negative direction; and means by which said pull bar forces said friction blocks against said side bars when said pull bar is pulled in a positive direction.

10. In a shock absorber, the combination of two side bars; adjustable elastic means for forcing one end of said bars towards each other; independent adjustable means for forcing the other end of said bars towards each other; two friction blocks sliding between said side bars; a pull bar; a pull strap fastened to one end of said pull bar and adapted to pull said pull bar in a positive direction; means for pulling said pull bar in a negative direction; and toggle members between said pull bar and said friction block so disposed as to force said friction blocks against said side bars when said pull bar is pulled in a positive direction.

11. In a shock absorber, the combination of two side bars; adjustable elastic means for forcing one end of said bars towards each other; independent adjustable means for forcing the other end of said bars towards each other; two friction blocks sliding between said side bars; a pull bar; a pull strap fastened to one end of said pull bar and adapted to pull said pull bar in a positive direction; a takeup strap fastened to the other end of said pull bar; means for exerting a tension on said takeup strap; and means by which said pull bar forces said friction blocks against said side bars when said pull bar is pulled in a positive direction.

12. In a shock absorber, the combination of two side bars; adjustable elastic means for forcing one end of said bars towards each other; independent adjustable means for forcing the other end of said bars towards each other; two friction blocks sliding between said side bars; a pull bar; a pull strap fastened to one end of said pull bar and adapted to pull said pull bar in a positive direction; a takeup strap fastened to the other end of said pull bar; means for exerting a tension on said takeup strap; and toggle members between said pull bar and said friction block so disposed as to force said friction blocks against said side bars when said pull bar is pulled in a positive direction.

13. In a shock absorber, the combination of two side bars; adjustable elastic means for forcing one end of said bars towards each other; independent adjustable means for forcing the other end of said bars towards each other; two friction blocks sliding between said side bars; a pull bar; a pull strap fastened to one end of said pull bar and adapted to pull said pull bar in a positive direction; a takeup strap fastened to the other end of said pull bar; a coil spring; means for fastening the other end of said takeup strap to said coil spring; and means by which said pull bar forces said friction blocks against said side bars when said pull bar is pulled in a positive direction.

14. In a shock absorber, the combination of two side bars; adjustable elastic means for forcing one end of said bars towards each other; independent adjustable means for forcing the other end of said bars towards each other; two friction blocks sliding between said side bars; a pull bar; a pull strap fastened to one end of said pull bar and adapted to pull said pull bar in a positive direction; a takeup strap fastened to the other end of said pull bar; a coil spring; means for fastening the other end of said takeup strap to said coil spring; and means by which said pull bar forces said friction blocks against said side bars when said pull bar is pulled in a positive direction.

In testimony whereof, we have hereunto set our hands at Los Angeles, California, this 3 day of January, 1922.

JOSEPH N. KELMAN.
JOHN H. KELMAN.